US012479997B2

(12) United States Patent
Koleas et al.

(10) Patent No.: US 12,479,997 B2
(45) Date of Patent: Nov. 25, 2025

(54) TITANIUM DIOXIDE ASPHALT COMPOSITIONS

(71) Applicant: CoolSeal LLC, Fontana, CA (US)

(72) Inventors: Robert Davis Koleas, Laguna Niguel, CA (US); Ronald Eugene Williams, Nuevo, CA (US)

(73) Assignee: CoolSeal LLC, Laguna Niguel, CA (US)

( * ) Notice: Subject to any disclaimer, the term of this patent is extended or adjusted under 35 U.S.C. 154(b) by 977 days.

(21) Appl. No.: 17/602,694

(22) PCT Filed: Dec. 19, 2018

(86) PCT No.: PCT/US2018/066431
§ 371 (c)(1),
(2) Date: Oct. 8, 2021

(87) PCT Pub. No.: WO2019/126288
PCT Pub. Date: Jun. 27, 2019

(65) Prior Publication Data
US 2022/0195195 A1 Jun. 23, 2022

Related U.S. Application Data

(60) Provisional application No. 62/608,881, filed on Dec. 21, 2017.

(51) Int. Cl.
| | | |
|---|---|---|
| *C08L 33/08* | (2006.01) | |
| *C08K 3/22* | (2006.01) | |
| *C08K 3/34* | (2006.01) | |
| *C08K 3/36* | (2006.01) | |
| *C08K 7/02* | (2006.01) | |
| *C08L 95/00* | (2006.01) | |

(52) U.S. Cl.
CPC ............. *C08L 95/005* (2013.01); *C08K 3/22* (2013.01); *C08K 3/346* (2013.01); *C08K 3/36* (2013.01); *C08K 7/02* (2013.01); *C08L 33/08* (2013.01); *C08K 2003/2241* (2013.01); *C08K 2201/005* (2013.01); *C08L 2201/52* (2013.01); *C08L 2203/162* (2013.01); *C08L 2555/32* (2013.01); *C08L 2555/34* (2013.01); *C08L 2555/50* (2013.01); *C08L 2555/52* (2013.01); *C08L 2555/80* (2013.01)

(58) Field of Classification Search
CPC .... C08L 95/005; C08L 33/08; C08L 2201/52; C08L 2203/162; C08L 2555/32; C08L 2555/34; C08L 2555/50; C08L 2555/52; C08L 2555/80; C08K 3/22; C08K 3/346; C08K 3/36; C08K 7/02; C08K 2003/2241; C08K 2201/005
USPC ........................................................ 106/277
See application file for complete search history.

(56) References Cited

U.S. PATENT DOCUMENTS

| | | | |
|---|---|---|---|
| 5,223,031 A | * | 6/1993 | Sugi .................... C04B 20/1044 |
| | | | 427/136 |
| 5,340,391 A | | 8/1994 | Grzybowski |
| 6,245,850 B1 | | 6/2001 | Fields |
| 6,881,701 B2 | | 4/2005 | Jacobs |
| 9,303,369 B1 | | 4/2016 | Durante et al. |
| 2008/0168926 A1 | | 7/2008 | Muller et al. |
| 2012/0118318 A1 | | 5/2012 | Hillebrandt Poulsen et al. |
| 2012/0190777 A1 | | 7/2012 | Houston et al. |

FOREIGN PATENT DOCUMENTS

| | | |
|---|---|---|
| WO | WO 2010/069997 A1 | 6/2010 |
| WO | WO 2011/120167 A1 | 10/2011 |
| WO | WO 2016/099466 | 6/2016 |

OTHER PUBLICATIONS

Akbari, H. et al., Characterizing the Fabric of the Urban Environment: A Case Study of Sacramento, California, U.S. Gov't, Environmental Energy Technologies Division, Dec. 1999.
Boonen, et al., "Recent Photocatalytic Applications for Air Purification in Belgium", *Coatings ISSN 2079-6412*, vol. 4, p. 553-573, 2014.
CA Energy Commission, "Evaluation of Titanium Dioxide as a Photocatalyst for Removing Air Pollutants", *Public Interest Energy Research Final Project Report*, Jan. 2008.
Anonymous: "Basic Asphalt Emulsion manual; MS-19; 4th Edition" In: "Basic Asphalt Emulsion manual; MS-19; 4th Edition", Feb. 1, 2008 (Feb. 1, 2008), Asphalt Institute, Lexington, Kentucky; USA, XP055100940, ISBN: 978-1-93-415456-4 p. i-iii,v-xi,1-3,5-12.
Anonymous: "Application of Titanium Dioxide Photocatalysis to Construction Materials; STAR 194-TDP", Rilem 194-TDP Report, Jan. 1, 2011 (Jan. 1, 2011), pp. 1-55, XP055827261.
Anonymous: "Guardtop Demonstrates Coolseal Sealcoat Product for City of Los Angeles", Dec. 14, 2016 (Dec. 14, 2016), pp. 1-4, XP055827588.
Akbari, Hashem et al. "Characterizing the Fabric of the Urban Environment: A Case Study of Salt Lake City, Utah (LBNL-47851)", USDOE Assistant Secretary for Energy Efficiency and Renewable Energy. Office of Building Technology, State and Community Programs; Environmental Protection Agency (US), Feb. 1, 2001 (Feb. 1, 2001), pp. 1-51, XP055827269, Berkeley, California 94720, USA.

(Continued)

*Primary Examiner* — Kelechi C Egwim
(74) *Attorney, Agent, or Firm* — MORGAN, LEWIS & BOCKIUS LLP

(57) ABSTRACT

An asphalt-based sealcoat composition comprising high levels of titanium oxide particles is provided. In some embodiments, a highly solar reflective asphalt-based sealcoat composition comprising high levels of titanium oxide particles is provided. In some embodiments, an asphalt-based sealcoat composition capable of reducing pollutants comprising high levels of titanium oxide particles is provided. In some embodiments, methods for preparing asphalt-based sealcoat compositions as well as their application to asphalt surfaces is provided.

21 Claims, No Drawings

(56) References Cited

OTHER PUBLICATIONS

Berndahl, Paul et al "Evaluation of Titanium Dioxide as a Photocatalyst for Removing Air Pollutants", Pier Energy-Related Environmental Research Program CEC-500-2007-12, Jan. 1, 2008 (Jan. 1, 2008), pp. 1-33, XP055827274.
Bocci, Edoardo et al. "Durability of NO Oxidation Effectiveness of Pavement Surfaces Treated with Photocatalytic Titanium Dioxide", Arabian Journal for Science and Engineering, Springer Berlin Heidelberg, Berlin/Heidelberg, vol. 41, No. 12, May 12, 2016 (May 12, 2016), pp. 4827-4833, XP036076540.
Crispino, M. et al "Innovative Photocatalytic Pavements", International Sustainable Pavements Workshop, Jan. 9, 2010 (Jan. 9, 2010), pp. 1-34, XP055827608.
Dictionary of Mining, Mineral, and Related Terms, Second Edition, U.S. Department of the Interior, 1996, pp. 1-3660.
Hassan, Marwa M. et al. "Evaluation of Nano-Titanium Dioxide Additive on Asphalt Binder Aging Properties", Transportation Research Record., vol. 2207, No. 1, Jan. 1, 2011 (Jan. 1, 2011), pp. 11-15, XP055827597.
Hassan Marwa, "Durability and Performance of Titanium Dioxide in Photocatalytic Pavements", Jan. 1, 2013 (Jan. 1, 2013), pp. 1-38, XP055827650.
Ishimori, Masaki "Treating Vehicle Exhaust Gas Using Photocatalytic Cement", Cement & Concrete No. 639, May 2000, pp. 1-12.
Pomerantz, M. et al "Paving Materials for Heat Island Mitigation", Nov. 1, 1997 (Nov. 1, 1997), pp. 1-29, XP055827494.
Pope McDowell, Jennifer et al "Los Angeles Cool Pavement Pilot", International Conference on Countermeasures to Urban Heat Islands, Dec. 4, 2019 (Dec. 4, 2019), pp. 1-41.
Sano, Kumiko et al. "The NOx Purification Mechanism of Photocatalyst Cement (ST-Coat)", Taiheiyo Cement Research Report No. 142 (2002), pp. 63-70.
Venturini, Loretta et al. "Research, Design and Development of a Photocatalytic Asphalt Pavement", Enviroad 2009, Jan. 1, 2009 (Jan. 1, 2009), Warsaw, Poland, pp. 1-16, XP055827991.
Wood, Thomas J. et al "Minnesota Seal Coat Handbook 2006, Manual No. 2006-34", Jun. 1, 2006 (Jun. 1, 2006), pp. 1-120, XP055576079.
Yamanda, Alan P. E. "Asphalt Seal Coat Treatments", Apr. 1, 1999 (Apr. 1, 1999), pp. 1-25, XP055594516.
Zou, Xiaolong et al. "Evaluation and Analysis of Variance of Storage Stability of Asphalt Binder Modified by Nanotitanium Dioxide", Advances in Materials Science and Engineering, vol. 2017, Jan. 1, 2017 (Jan. 1, 2017), pp. 1-12, XP055827268.

* cited by examiner

TITANIUM DIOXIDE ASPHALT COMPOSITIONS

CROSS REFERENCE TO RELATED APPLICATIONS

This patent application claims priority to U.S. patent application Ser. No. 15/852,965 entitled "Titanium Dioxide Asphalt Compositions," filed Dec. 22, 2017, which, in turn, claims priority to U.S. Patent Application No. 62/608,881 entitled "Titanium Dioxide Asphalt Compositions," filed Dec. 21, 2017, each of which is hereby incorporated by reference.

TECHNICAL FIELD

The field of disclosure relates to asphalt-based sealcoat compositions comprising titanium oxide ($TiO_2$) particles.

BACKGROUND

The technology to which the invention is directed relates to a sealer used for asphalt substrates, such as a sealer for asphalt of the type employed extensively throughout the United States. Pavement technology has developed a series of asphalt coating compositions. Many of the asphalt compositions have been applied to asphalt, sometimes as a protective coating and sometimes as a re-cover system. Such asphalt mixtures have little or no reflectivity in that they are typically black in color, are not solar reflective, do not reduce surface temperatures, and do not reduce pollutants.

However, it has been found that conventional dark pavements rapidly increase in temperature when exposed to sunlight because they absorb 80-95% of the sunlight and significantly contribute to the creation of heat islands. Heat islands are built up areas that are hotter than nearby rural areas. For example, the annual mean air temperature of a city with one million people or more can be 1.8-5.4° F. (1-3° C.) warmer than its surroundings. In the evening, the difference can be as high as 22° F. (12° C.). Heat islands can affect communities by increasing summertime peak energy demand, air conditioning costs, air pollution and greenhouse gas emissions, heat-related illness and mortality, and water quality. According to Akbari et al. hot pavements aggravate urban heat islands by warming the local air, and contribute to global warming by radiating heat into the atmosphere as pavements can aggravate urban heat islands because they comprise about one third of urban surfaces (Akbari H, Rose L S, Taha H. 1999. Characterizing the fabric of the urban environment: A case study of Sacramento, California. Lawrence Berkeley National Laboratory). Moreover, hot pavement can also raise the temperature of storm water runoff, which can cause additional negative impacts. Thus there exists a real need for lowering asphalt surface temperatures.

In addition, vehicles traveling on asphalt surfaces have been known to produce significant levels of pollutants. While pollutants have long been known to have a negative environmental impact, photocatalytic air cleaning has also been shown to remove polutants including nitrogen oxides (NOx) and volatile organic compounds (VOCs) from polluted urban air, and, consequently, for reducing concentrations of toxic and irritating ozone, a key constituent of smog that forms on hot, sunny days.

Thus, there is a need for novel high-performance asphalt-based sealcoat compositions that are highly solar reflective, reduce surface temperatures, and reduce pollutants via photocatalytic reactions.

SUMMARY

The present disclosure relates to a novel high-performance asphalt-based sealcoat compositions comprising titanium oxide ($TiO_2$) particles. In some embodiments, the present disclosure relates to an asphalt-based sealcoat composition that is highly solar reflective. In some embodiments, the present disclosure relates to an asphalt-based sealcoat composition that is capable of reducing surface temperatures of asphalt treated with the asphalt-based sealcoat composition relative to asphalt not treated with asphalt-based sealcoat composition. In some embodiments, the present disclosure relates to an asphalt-based sealcoat composition that is capable of reducing pollutants.

In one aspect, the present disclosure relates to an asphalt-based sealcoat composition comprising an asphalt emulsion, water, a polymer emulsion, clay, and titanium oxide ($TiO_2$) particles, where the $TiO_2$ is present in the composition in an amount of about 30.5% to about 45% by weight.

In some embodiments, the present disclosure provides an asphalt-based sealcoat composition comprising an asphalt emulsion, water, sand, a polymer emulsion, clay, and $TiO_2$ particles, where the $TiO_2$ is present in the composition in an amount of about 20.5% to about 60% by weight.

In some embodiments, the present disclosure provides an asphalt-based sealcoat composition comprising an asphalt emulsion, water, an extender, a polymer emulsion, clay, and $TiO_2$ particles, where the $TiO_2$ is present in the composition in an amount of about 20.5% to about 60% by weight.

In another aspect, the present disclosure relates to an asphalt-based sealcoat composition that is highly solar reflective. In some embodiments, the asphalt-based sealcoat has a SR (Solar Reflectivity) number of between about 0.10 and about 0.45. In some embodiments, the asphalt-based sealcoat of the present disclosure has a SR # of from about 0.30 to about 0.34. In some embodiments, the asphalt-based sealcoat of the present disclosure has a SRI (Solar Reflective Index) #from about 10 to about 60.

In another aspect, the present disclosure relates to an asphalt-based sealcoat composition that reduces pollutants. In some embodiments, the asphalt-based sealcoat composition reduces atmospheric pollutants including an amount of nitrogen oxides (NOx) and volatile organic compounds (VOC) via photocatalytic reactions. In some embodiments, the asphalt-based sealcoat composition is highly solar reflective and reduces asphalt surface temperatures and pollutants. In some embodiments, the titanium dioxide acts as a catalyst, reacting with nitrogen oxides and other pollutants to chemically alter them into non-hazardous or less hazardous materials through photocatalytic oxidation (PCO) and/or reduction reaction.

The present technology relates primarily to the treatment of any asphalt surface including roads, playgrounds, parks, parking lots, driveways, residential areas, schools, bike paths, and LEED-certified building projects.

DETAILED DESCRIPTION

I. Definitions and Abbreviations

As used herein, the singular forms "a," "an", and "the" include plural references unless the context clearly dictates otherwise. For example, reference to "an active agent" includes a single active agent as well as two or more different active agents in combination. It is to be understood that present teaching is not limited to the specific dosage forms, carriers, or the like, disclosed herein and as such may vary.

The abbreviations used herein generally have their conventional meaning and are readily appreciated by those skilled in the art The terms "Solar Reflectivity" "reflectance" and "R" refer to the ability of a material to reflect solar energy from its surface back into the atmosphere. The SR value is a number from 0 to 1.0. A value of 0 indicates that the material absorbs all solar energy and a value of 1.0 indicates total reflectance.

The terms "Solar Reflectance Index" and "SRI" refer to the index used for compliance with LEED requirements and is calculated according to ASTM E 1980 using values for reflectance and emissivity. Emissivity is a material's ability to release absorbed energy.

II. Introduction

The present disclosure provides novel compositions. The novel compositions, as well as formulations containing such compositions or combinations of these compositions, can be used for, among other things, treating an asphalt surface.

III. Asphalt-Based Sealcoat Composition

In one aspect, the present disclosure provides a composition. In an exemplary embodiment, the invention is a composition described herein. In an exemplary embodiment, the invention is a composition according to a formula described herein.

In one aspect, the present disclosure relates to an asphalt-based sealcoat composition comprising an asphalt emulsion, water, a polymer emulsion, clay, and titanium oxide ($TiO_2$) particles, where the $TiO_2$ is present in the composition in an amount of about 30.5% to about 45% by weight. In some embodiments, the present disclosure provides an asphalt-based sealcoat composition comprising an asphalt emulsion, water, sand, a polymer emulsion, clay, and $TiO_2$ particles, where the $TiO_2$ particles are present in the composition in an amount of about 20.5% to about 60% by weight. In some embodiments, the present disclosure provides an asphalt-based sealcoat composition comprising an asphalt emulsion, water, an extender, a polymer emulsion, clay, and $TiO_2$ particles, where the $TiO_2$ particles are present in the composition in an amount of about 20.5% to about 60% by weight.

In one aspect, the present disclosure relates to composition comprising a CSS-1h asphalt emulsion present in the composition an amount of about 23.2%, and in which water is present in the amount of about 22.1% by weight, sand (e.g., #200 sand) is present in an amount of about 10.4% by weight, a polymer emulsion (e.g., acrylic latex) is present in an amount of about 5.8% by weight, clay (e.g., bentonite clay) is present in an amount of about 4.1% by weight, fiber (e.g., #425 fiber, recycled paper) is present in an amount of about 1.1% by weight, biocide is present in an amount of about 0.3% by weight, and $TiO_2$ is present in an amount of about 33.0% by weight.

Example Asphalt Composition Preparation

Titanium dioxide pigmented asphalt emulsion is prepared by forming a slurry. The slurry comprises between 75 percent to 85 percent water by weight, between 1 percent to six percent by weight fiber, and between 10 percent and 20 percent by weight clay. This slurry is used as a starting point to make the titanium dioxide pigmented asphalt emulsion. To the slurry is added a mixture of ingredients such that the final amount of the slurry after addition of these ingredients is between 20 percent and 30 percent by weight. One such ingredient added to the slurry is $TiO_2$, such that the final composition of $TiO_2$ in the product by weight after all ingredients are added is between 31 percent to about 40 percent by weight. Another such ingredient that is added to the slurry is sand, such that the final composition of sand in the product by weight after all ingredients are added is between 5 percent and 20 percent by weight. After the $TiO_2$ and sand have been thoroughly mixed into the slurry, additional ingredients are added including oil, latex, polymer emulsion and additional water such that the composition of the titanium dioxide pigmented asphalt emulsion includes between 5 percent and 40 percent oil (asphalt, e.g., CSS-1h), and between 4 percent and 20 percent by weight polymer emulsion. The disclosed compositions can be made using comparable methods.

Titanium Oxide

In some embodiments, the $TiO_2$ particles are present in the composition in an amount of from about 31% to about 40% by weight. In some embodiments, the $TiO_2$ particles are present in an amount of from about 32% to about 38% by weight. In some embodiments, the $TiO_2$ particles are present in an amount of from about 32.5% to about 36% by weight. In some embodiments, the $TiO_2$ particles are present in an amount of about 33.0% by weight. In some embodiments, the $TiO_2$ particles are present in an amount of from about 33% to about 35.5% by weight. In some embodiments, $TiO_2$ particles are present in an amount of from about 33.5% to about 35% by weight. In some embodiments, the $TiO_2$ particles are present in an amount of from about 34% to about 35% by weight. In some embodiments, the titanium oxide ($TiO_2$) particles are present in an amount of from about 21% to about 80% by weight. In some embodiments, the titanium oxide ($TiO_2$) particles are present in an amount of from about 21% to about 60% by weight. In some embodiments, the $TiO_2$ particles are present in an amount of from about 25% to about 50% by weight. In some embodiments, the $TiO_2$ particles are present in an amount of from about 25% to about 40% by weight. In some embodiments, the $TiO_2$ particles are present in an amount of from about 30% to about 35% by weight. In some embodiments, the $TiO_2$ particles are present in an amount of from about 33.0% to about 34.0% by weight.

In some embodiments, the $TiO_2$ particles comprise an anatase powder form of $TiO_2$. In some embodiments, the $TiO_2$ particles comprise a brookite powder form of $TiO_2$. In some embodiments, the $TiO_2$ particles comprise a rutile powder form of $TiO_2$. In some embodiments, the $TiO_2$ particles comprise anatase powder form of $TiO_2$, a brookite powder form of $TiO_2$, a rutile powder form of $TiO_2$, or any mixture of any combination thereof.

Asphalt

In some embodiments, the asphalt emulsion is present in an amount of from about 5% to about 40% by weight. In some embodiments, the asphalt emulsion is present in an amount of from about 10% to about 35% by weight. In some embodiments, the asphalt emulsion is present in an amount of from about 15% to about 30% by weight. In some embodiments, the asphalt emulsion is present in an amount of from about 15% to about 25% by weight. In some embodiments, the asphalt emulsion is present in an amount of from about 20% to about 24% by weight. In some embodiments, the asphalt emulsion is present in an amount of about 23.2% by weight. In some embodiments, the asphalt emulsion is selected from the group consisting of CSS-1h, CSS-1, SS-1h, SS-1, clay-based emulsions, or any mixture thereof.

Water

In some embodiments, the water is present in an amount of from about 15% to about 45% by weight. In some embodiments, the water is present in an amount of from about 18% to about 35% by weight. In some embodiments, the water is present in an amount of from about 20% to about 30% by weight. In some embodiments, the water is present in an amount of from about 21% to about 25% by weight. In some embodiments, the water is present in an amount of about 22.1% by weight.

Polymer Emulsion

In some embodiments, the polymer emulsion is present in an amount of from about 1% to about 35% by weight. In some embodiments, the polymer emulsion is present in an amount of from about 2% to about 30% by weight. In some embodiments, the polymer emulsion is present in an amount of from about 3% to about 25% by weight. In some embodiments, the polymer emulsion is present in an amount of from about 4% to about 20% by weight. In some embodiments, the polymer emulsion is present in an amount of from about 4.5% to about 15% by weight. In some embodiments, the polymer emulsion is present in an amount of from about 5% to about 10% by weight. In some embodiments, the polymer emulsion is present in an amount of from about 5.5% to about 8% by weight. In some embodiments, the polymer emulsion is present in an amount of about 5.8% by weight.

In some embodiments, the polymer emulsion comprises an acrylic polymer, a styrene acrylic, vinyl acetate ethylene, a styrene-butadiene copolymer resin (SBR), a polyvinyl acetate, or a mixture thereof. In some embodiments, the polymer emulsion comprises acrylic latex, polyurethane, SBR (styrene-buladiene rubber), SBS (styrene-butadiene-styrene), polychloroprene, polyvinyl acetate, polyvinyl acetate ether, polyvinyl alcohols, parboxylic acid, synthetic Rubber, natural rubber, recycled tire rubber, LDP (low density polyethylene), ECA (ethaline vinyl acetate), nitrile latex, DuPont Elvaloy Polymer Modifier, or any mixture thereof.

In some embodiments, the polymer emulsion introduced as a polymer latex or water-borne polymer as a component separate and independent from the asphalt.

By way of example, in some embodiments the polymer emulsion comprises formaldehyde (<0.05 percent by weight), styrene butadiene polymer (17-29 percent by weight), vinyl acetate (<0.05 percent by weight), acrylic polymer (28-48 percent by weight), less than 0.05 percent ammonia by weight, and between 47 and 53 percent water by weight.

Clay

In some embodiments, the clay is present in an amount of from about 1% to about 10% by weight. In some embodiments, the clay is present in an amount of from about 2% to about 8% by weight. In some embodiments, the clay is present in an amount of from about 3% to about 6% by weight. In some embodiments, the clay is present in an amount of from about 4% to about 5% by weight. In some embodiments, the clay is present in an amount of about 4.1% by weight.

In some embodiments, the clay is selected from the group consisting of bentonite clay, ball clay, fire clay, sepiolite clay, illite, montmorillonite, hawthorn clay, American colloid clay, hickory clay, Lincoln clay, or any mixture thereof. In some embodiments, the clay is Bentonite clay.

Sand

In some embodiments, the composition further comprises sand present in an amount of about 5% to about 20% by weight. In some embodiments, the sand is present in an amount of from about 8% to about 15% by weight. In some embodiments, the sand is present in an amount of from about 9% to about 12% by weight. In some embodiments, the sand is present in an amount of about 10.4% by weight.

In some embodiments, the sand has a particle size mesh from about 16 to about 300. In some embodiments, the sand has a particle size mesh from about 30 to about 280. In some embodiments, the sand has a particle size mesh from about 60 to about 260. In some embodiments, the sand has a particle size mesh from about 80 to about 240. In some embodiments, the sand has a particle size mesh from about 100 to about 220. In some embodiments, the sand has a particle size mesh of about 200.

Extenders

In some embodiments, the composition further comprises an extender. In some embodiments, the extender is present in an amount of from about 1% to about 10% by weight. In some embodiments, the extender is present in an amount of from about 2% to about 8% by weight. In some embodiments, the extender is present in an amount of from about 3% to about 6% by weight. In some embodiments, the extender is present in an amount of from about 4% to about 5% by weight. In some embodiments, the extender is present in an amount of about 4.1% by weight.

In some embodiments, the extender is selected from the group consisting of marble white, granulated calcium carbonate, kaolin, and kaolinite, imerys talcs, Grace SYLOWHITE™, Burgess Pigment Company kaolins, or any mixture thereof. In some embodiments, the extender is marble white.

Fiber

In some embodiments, the composition further comprises fiber present in an amount of about 0.1% to about 5% by weight. In some embodiments, the fiber is present in an amount of from about 0.5% to about 3% by weight. In some embodiments, the fiber is present in an amount of from about 0.9% to about 2% by weight. In some embodiments, the fiber is present in an amount of about 1.1% by weight. In some embodiments, the fiber is recycled paper.

Aggregates

In some embodiments, the composition further comprises an aggregate present in an amount of about 0.1% to about 25% by weight. In some embodiments, the aggregate is present in an amount of from about 0.5% to about 20% by weight. In some embodiments, the aggregate is present in an amount of from about 0.9% to about 15% by weight. In some embodiments, the aggregate is present in an amount of about 1.1% by weight.

In some embodiments, the aggregate is selected from the group consisting of slate, baghouse fines (rock dust), fly ash, silica sand, calcium carbonite, clay, paper fiber, fiberglass fiber, limestone aggregate, copper slag, recycled roofing shingles, granite aggregate, ground tire rubber, ground up tennis balls, recycled cardboard, recycled glass, wood chips, wood fiber, scrabbled stone, pumice, basaltic aggregate, perlite, vermiculite, marble white, or any mixture thereof. In some embodiments, the aggregate is slate.

Biocide

In some embodiments, the composition further comprises biocide. In some embodiments, the biocide is present in an amount of from about 0.01% to about 5% by weight. In some embodiments, the biocide is present in an amount of from about 0.1% to about 2% by weight. In some embodiments, the biocide is present in an amount of about 0.3% by weight.

IV. Reflectance of Asphalt-Based Sealcoat Composition

In one aspect, the present disclosure relates to an asphalt-based sealcoat composition that is highly solar reflective. In some embodiments, the asphalt-based sealcoat has a SR (Solar Reflectivity) number of from about 0.10 to about 0.45. In some embodiments, the asphalt-based sealcoat has a SR # of from about 0.20 to about 0.40. In some embodiments, the asphalt-based sealcoat has a SR # of from about 0.25 to about 0.35. In some embodiments, the asphalt-based sealcoat has a SR # of from about 0.30 to about 0.34. In some embodiments, the asphalt-based sealcoat has a SR (Solar Reflectivity) # of 0.33. In some embodiments, asphalt-based sealcoat has a SRI (Solar Reflective Index) #from about 10 to about 60. In some embodiments, the asphalt-based sealcoat has a SRI #from about 15 to about 50. In some embodiments, the asphalt-based sealcoat has a SRI#from about 20 to about 40. In some embodiments, the asphalt-based sealcoat has a SRI #from about 25 to about 35. In some embodiments, the asphalt-based sealcoat has a SRI # of about 29.

In some embodiments, the asphalt-based sealcoat composition reduces surface temperatures of asphalt treated with the asphalt-based sealcoat composition compared to asphalt not treated with asphalt-based sealcoat composition.

In some embodiments, the reflectance of the asphalt-based sealcoat composition is determined using a pyrometer at different times of day over a two-month period according to ASTM E1918-16, Standard Test Method for Measuring Solar Reflectance of Horizontal and Low-Sloped Surfaces in the Field, ASTM International, West Conshohocken, PA, 2016, www.astm.org. Due to the varying position and angle of the sun during these times, this allows measurements of multiple different areas within test sections of the asphalt-based sealcoat composition.

In some embodiments, the reflectance and thermal emissivity of the asphalt-based sealcoat composition is determined by subjecting a core of a section of the composition to ASTM C 1549 (ASTM C1549-16, "Standard Test Method for Determination of Solar Reflectance Near Ambient Temperature Using a Portable Solar Reflectometer," ASTM International, West Conshohocken, PA, 2016, www.astm.org) and ASTM C1371 (ASTM C1371-15, "Standard Test Method for Determination of Emittance of Materials Near Room Temperature Using Portable Emissometers," ASTM International, West Conshohocken, PA, 2015, www.astm.org), respectively. SRI values can then be calculated according to ASTM E1980-11 ("Standard Practice for Calculating Solar Reflectance Index of Horizontal and Low-Sloped Opaque Surfaces," ASTM International, West Conshohocken, PA, 2001, www.astm.org).

V. Reducing Atmospheric Pollutants With an Asphalt-Based Sealcoat Composition It has been found that titanium dioxide ($TiO_2$) nanoparticles can absorb the ultraviolet component of sunlight, acting as a catalyst to form reactive hydroxyl (OH) radicals in the presence of atmospheric moisture. These radicals have been found to oxidize and destroy most pollutant molecules.

The present technology, in some embodiments, is a method of reducing nitrogen oxides (NOx), volatile organic compounds (VOC), and other pollutants by an asphalt-based sealcoat composition comprising high levels of titanium oxide particles. The titanium oxide particles forming a photocatalytic layer within the asphalt surface that oxidizes NOx and other pollutants when the treated asphalt surface is exposed to ultraviolet sunlight and airborne $H_2O$ molecules. This process chemically alters the aforementioned pollutants, rendering them non-hazardous to the environment.

$TiO_2$ is a semiconductor material that when exposed to ultraviolet (UV) radiation, as from sunlight, expels an electron from the valence band to the conduction band, leaving behind a positively charged hole. In the presence of water, as in atmospheric humidity, these positively charged holes create hydroxyl radicals as shown:

$$OH^- + h^+ \rightarrow {}^*OH$$

The hydroxyl radicals in turn oxidize nitrogen oxides as follows:

$$NO + {}^*OH \rightarrow NO_2 + H+$$

$$NO_2 + {}^*OH \rightarrow NO_{3-} + H+$$

Other reactive effects occur with volatile organic compounds (VOC) and some other pollutants. Since $TiO_2$ functions as a catalyst and is not consumed in the reaction, the photocatalytic effect continues. If the $TiO_2$ is in place at the surface of an asphalt roadway, it removes a significant quantity of NOx and VOCs from the environment nearest their source.

In one aspect, the present disclosure relates to an asphalt-based sealcoat composition that reduces pollutants. In some embodiments, the asphalt-based sealcoat composition reduces atmospheric pollutants including an amount of nitrogen oxides (NOx) and volatile organic compounds (VOC). In some embodiments, the asphalt-based sealcoat composition is highly solar reflective and reduces asphalt surface temperatures and pollutants. In some embodiments, the asphalt-based sealcoat composition has a SR (Solar Reflectivity) # of 0.33, and reduces asphalt surface temperatures and pollutants.

In some embodiments, the titanium dioxide can act as a catalyst, which reacts with nitrogen oxides and other pollutants to chemically alter them into non-hazardous or less hazardous materials through photocatalytic oxidation (PCO) and/or reduction reaction.

In some embodiments, the techniques disclosed in Berdahl and Akbari, 2008, "Evaluation of Titanium Dioxide as a Photocatalyst for Removing Air Pollutants," California Energy Commission, PIER Energy-Related Environmental Research Program, CEC-500-2007-112, the references cited therein, and the appendices thereof, can be used to determine the amount by which the compositions of the present disclosure can reduce air pollutants such as nitrogen oxide.

VI. Method of Treating Asphalt Surface With an Asphalt-Based Sealcoat Composition In yet another aspect, the present disclosure relates to a method for treating an asphalt surface, the method comprising: applying an amount of an asphalt-based sealcoat composition to an upper surface of the asphalt surface. In some embodiments, the asphalt-based sealcoat composition is diluted with 1% to 50% additional water at the time of application. In some embodiments, the asphalt-based sealcoat composition is diluted with 10% to 30% additional water at the time of application. In some embodiments, the asphalt-based sealcoat composition is diluted with 15% to 25% additional water at the time of application. In some embodiments, the asphalt-based sealcoat composition is diluted with 20% additional water at the time of application.

EXAMPLES

The following Examples illustrate the synthesis of representative compounds used in the invention and the following Reference Examples illustrate the synthesis of intermediates in their preparation. These examples are not intended, nor are they to be construed, as limiting the scope of the invention. It will be clear that the invention may be practiced otherwise than as particularly described herein. Numerous modifications and variations of the invention are possible in view of the teachings herein and, therefore, are within the scope of the invention.

In the examples below, unless otherwise indicated, all temperatures are set forth in degrees Celsius and all parts and percentages are by weight. Reagents may be purchased from commercial suppliers, and may be used without further purification unless otherwise indicated. Reagents may also be prepared following standard literature procedures known to those skilled in the art. Solvents may be purchased from commercial suppliers, and may be used as received unless otherwise indicated. All solvents may be purified using standard methods known to those skilled in the art, unless otherwise indicated.

Starting materials used were either available from commercial sources or prepared according to literature procedures and had experimental data in accordance with those reported.

Example 1

Preparation of the Asphalt Compositions in Accordance With the Present Disclosure Coolseal—UP 7814. A batch of titanium dioxide pigmented asphalt emulsion entitled batch "Coolseal UP 7814" was prepared by forming 37,010 pounds of a slurry in a vertical high sheer mixer. The slurry consisted of 3,532 gallons of water, 1,588 pounds of fiber, and 6,004 pounds of clay. A total of 12,390 pounds (1,332 gallons) of this slurry was then used as a starting point to make the titanium dioxide pigmented asphalt emulsion. To the 12,390 pounds of slurry was added 17,139 pounds of $TiO_2$ and 3,545 pounds of sand. After thorough mixing, 11,568 pounds (1,389 gallons) of oil (CSS), 3,184 pounds (375 gallons) of latex (Avicor), 943 pounds (118 gallons) of polymer emulsion (UP7814), and 1,479 pounds (178 gallons) of additional water were added, resulting in a batch of 50,248 pounds of titanium dioxide pigmented asphalt emulsion. The composition of the batch by weight was about 22.59 percent water, 1.06 percent fiber, 4.01 percent clay, 34.18 percent $TiO_2$, 7.07 percent sand, 23.07 percent oil (CSS), 6.35 percent latex (Avicor), and 1.88 percent polymer emulsion (UP7814).

Rose Paving. A batch of titanium dioxide pigmented asphalt emulsion entitled batch "Rose Paving" was prepared by forming 37,008 pounds of a slurry in a vertical high sheer mixer. The slurry consisted of 3,531 gallons of water, 1,588 pounds of fiber, and 6,003 pounds of clay. A total of 12,638 pounds (1,359 gallons) of this slurry was then used as a starting point to make the titanium dioxide pigmented asphalt emulsion. To the 12,638 pounds of slurry was added 16,339 pounds of $TiO_2$ and 5,125 pounds of sand. After thorough mixing, 11,469 pounds (1,377 gallons) of oil (CSS), 3,576 pounds (421 gallons) of latex (Etonis 142), and 1,003 pounds (120 gallons) of additional water were added, resulting in a batch of 50,150 pounds of titanium dioxide pigmented asphalt emulsion. The composition of the batch by weight was 22.03 percent water, 1.08 percent fiber, 4.09 percent clay, 32.58 percent $TiO_2$, 10.22 percent sand, 22.87 percent oil (CSS), and 7.13 percent latex (Etonis 142).

Batch GT-102. A batch of titanium dioxide pigmented asphalt emulsion entitled batch "GT-102" was prepared by forming 37,008 pounds of a slurry in a vertical high sheer mixer. The slurry consisted of 3,531 gallons of water, 1,588 pounds of fiber, and 6,003 pounds of clay. A total of 1,890 pounds (203 gallons) of this slurry was then used as a starting point to make the titanium dioxide pigmented asphalt emulsion. To the 1,890 pounds of slurry was added 2,444 pounds of $TiO_2$ and 767 pounds of sand. After thorough mixing, 1,715 pounds (206 gallons) of oil (CSS), 535 pounds (63 gallons) of latex (Etonis 142), and 150 pounds (18 gallons) of additional water were added, resulting in a batch of 7,500 pounds of titanium dioxide pigmented asphalt emulsion. The composition of the batch by weight was 22.03 percent water, 1.08 percent fiber, 4.09 percent clay, 32.58 percent $TiO_2$, 10.22 percent sand, 22.87 percent oil (CSS), and 7.13 percent latex (Etonis 142).

Batch Coolseal 2. A batch of titanium dioxide pigmented asphalt emulsion entitled batch "Coolseal 2" was prepared by forming 37,014 pounds of a slurry in a vertical high sheer mixer. The slurry consisted of 3,765 gallons of water, 751 pounds of fiber, and 4,893 pounds of clay (sepiolite). A total of 12,081 pounds (1,299 gallons) of this slurry was then used as a starting point to make the titanium dioxide pigmented asphalt emulsion. To the 12,081 pounds of slurry was added 17,206 pounds of $TiO_2$ and 3546 pounds of sand. After thorough mixing, 11,775 pounds (1,414 gallons) of oil (CSS), 3,867 pounds of latex (Etonis 142), and 1,535 pounds (184 gallons) of additional water were added, resulting in a batch of 50,010 pounds of titanium dioxide pigmented asphalt emulsion. The composition of the batch by weight was about 23.47 percent water, 0.49 percent fiber, 3.18 percent clay, 34.31 percent $TiO_2$, 7.07 percent sand, 23.48 percent oil (CSS), and 7.71 percent latex (Etonis 142).

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. An asphalt-based sealcoat composition comprising an asphalt emulsion, water, an extender, a polymer emulsion, clay, sand, fiber, and titanium oxide ($TiO_2$) particles, wherein
the sand is present in the composition in an amount of about 5% to about 20% by weight of the composition;
the fiber is present in the composition in an amount of about 0.1% to about 5% by weight of the composition; and
the $TiO_2$ particles are present in the composition in an amount of about 20.5% to about 60% by weight of the composition.

2. The composition of claim 1, wherein the $TiO_2$ particles are present in the composition in an amount of from about 25% to about 50% by weight of the composition.

3. The composition of claim 1, wherein the asphalt emulsion is present in the composition in an amount of from about 5% to about 40% by weight of the composition.

4. The composition of claim 1, wherein the asphalt emulsion is selected from the group consisting of CSS-1h, CSS-1, SS-1h, SS-1, and clay-based emulsions, or a mixture thereof.

5. The composition of claim 1, wherein the water is present in the composition in an amount of from about 15% to about 45% by weight of the composition.

6. The composition of claim 1, wherein the polymer emulsion is present in the composition in an amount of from about 1% to about 35% by weight of the composition.

7. The composition of claim 1, wherein the polymer emulsion is selected from the group consisting of acrylic latex, polyurethane, SBR (styrene-butadiene rubber), SBS (styrene-butadiene-styrene), polychloroprene, polyvinyl acetate, polyvinyl acetate ether, polyvinyl alcohols, carboxylic acid, synthetic rubber, natural rubber, recycled tire rubber, LDP (low density polyethylene), EVA (ethaline vinyl acetate), nitrile latex, or a mixture thereof.

8. The composition of claim 1, wherein the clay is present in the composition in an amount of from about 1% to about 10% by weight of the composition.

9. The composition of claim 1, wherein the clay is bentonite clay, ball clay, fire clay, sepiolite clay, illite, montmorillonite, hawthorn clay, American colloid clay, hickory clay, Lincoln clay, or a mixture thereof.

10. The composition of claim 1, wherein the sand is present in the composition in an amount of from about 8% to about 15% by weight of the composition.

11. The composition of claim 1, wherein the sand has a particle size mesh from about 16 to about 300.

12. The composition of claim 1, wherein the extender is present in the composition in an amount of from about 1% to about 10% by weight of the composition.

13. The composition of claim 1, wherein the extender is marble white, granulated calcium carbonate, kaolin, and kaolinite, imerys talcs, or any mixture thereof.

14. The composition of claim 1, wherein the fiber is present in the composition in an amount of from about 0.5% to about 3% by weight of the composition.

15. The composition of claim 1, wherein the fiber is recycled paper.

16. The composition of claim 1, further comprising an aggregate present in the composition in an amount of about 0.1% to about 25% by weight of the composition.

17. The composition of claim 16, wherein the aggregate is slate, baghouse fines (rock dust), fly ash, silica sand, calcium carbonite, clay, paper fiber, fiberglass fiber, limestone aggregate, copper slag, recycled roofing shingles, granite aggregate, ground tire rubber, ground up tennis balls, recycled cardboard, recycled glass, wood chips, wood fiber, scrabbled stone, pumice, basaltic aggregate, perlite, vermiculite, marble white, or any combination thereof.

18. The composition of claim 1, further comprising biocide present in the composition in an amount of from about 0.01% to about 5% by weight of the composition.

19. The composition of claim 1, wherein the asphalt-based sealcoat has a SR (Solar Reflectivity) # of from about 0.10 to about 0.45.

20. The composition of claim 1, wherein the asphalt-based sealcoat has a SRI (Solar Reflective Index) #from about 10 to about 60.

21. The composition of claim 3, wherein:
the asphalt emulsion is present in the composition in an amount of from 5% to 40% by weight of the composition;
the water is present in the composition in an amount of from about 15% to about 45% by weight of the composition;
the extender is present in the composition in an amount of from about 1% to about 10% by weight of the composition;
the polymer emulsion is present in the composition in an amount of from about 1% to about 35% by weight of the composition; and
the clay is present in the composition in an amount of from about 1% to about 10% by weight of the composition.

* * * * *